UNITED STATES PATENT OFFICE.

222,694

JOSEPH A. GREER, OF STERLING, ILLINOIS, ASSIGNOR OF ONE-THIRD OF HIS RIGHT TO WILLIAM PITTMAN, OF SAME PLACE.

IMPROVEMENT IN COMPOUNDS FOR ARTIFICIAL STONE.

Specification forming part of Letters Patent No. 222,694, dated December 16, 1879; application filed June 2, 1879.

*To all whom it may concern:*

Be it known that I, JOSEPH A. GREER, of the city of Sterling, in the county of Whiteside and State of Illinois, have invented certain new and useful Compounds for the Manufacture of Artificial Stone; and I do hereby declare the following to be a full, clear, and exact description of the invention, such as will enable others skilled in the art to which it appertains to make and use the same.

This invention relates to that class of compounds used in the manufacture of artificial stone; and it consists in a composition formed by mixing certain materials in solution and treating them in further solutions, as follows:

Take four (4) parts of silicious sand, one (1) part of hydraulic cement, two (2) parts marl or infusorial earth, two (2) parts of silicate of alumina or burned clay, one (1) part of powdered limestone, and two (2) parts of slag or iron-filings. Mix these thoroughly by passing first through a coarse sieve and then through a fine sieve. Then make a solution of the following materials, to wit: Eight (8) ounces of potassium carbonate in two gallons of water, which is neutralized by pouring in sulphuric acid until effervescence ceases; then add two (2) pounds of litharge, one pound of oxide of iron, two (2) ounces of sodium carbonate, one-half ($\frac{1}{2}$) pound of black oxide of manganese, and one pound of calcium—a preparation sold by that name made from chalk and silica; then add thirty (30) more gallons of water, making in all thirty-two (32) gallons of water; then moisten the powder with the above solution, being careful not to make it too moist. About one-sixth ($\frac{1}{6}$) part of the solution to one part of the powder will be about the right proportion; then press or tamp into molds of the desired form. During the tamping process avoid striking heavy blows. Short, quick, light blows are better. I prefer tamping to pressure. When formed in molds, take out the material and place it on a rack to dry. While drying moisten once a day for from five to eight days with the last above-named solution reduced one-half ($\frac{1}{2}$) with water.

When the stones are dry place them in a tank containing the following solution: Carbonate of soda, two and one-tenth pounds, and water, twenty-five and five-tenths pounds; boil two to three hours, then add one-fifth ($\frac{1}{5}$) of the whole of water. Leave the stone in this tank one (1) hour; then take them out and let them dry thirty-six (36) hours; then place the stone in another tank containing a solution formed by dissolving three ounces of alum in each gallon of water. Leave the stone in this last tank about twenty (20) minutes; then take them to the drying-yard, and in twelve hours they are ready for use.

For any desired color use in the first-named composition the mineral oxide corresponding in color to that desired.

Where tanks are not convenient the two solutions last named may be applied with a flat brush.

The union of the two last-named solutions form an insoluble coating applicable to brick or any stone.

What I claim as my invention, and desire to secure by Letters Patent, is—

1. A compound for artificial stone, consisting of the ingredients first named herein, in combination with the solutions named, in the manner substantially as described, and for the purpose named.

2. A compound for coating brick and stone, consisting of a solution of carbonate of soda, two and one-tenth pounds, and water, twenty-five and five-tenths pounds, boiled together two or three hours, and one-fifth more water added, and a solution of three ounces of alum in each gallon of water, in combination, substantially as shown, and for the purpose mentioned.

In testimony that I claim the foregoing I have hereunto set my hand this 23d day of May, 1879.

JOSEPH A. GREER.

Witnesses:
JAS. S. THOMPSON,
JOHN J. MEGUIRE.